United States Patent [19]

Freed et al.

[11] Patent Number: 5,413,056
[45] Date of Patent: May 9, 1995

[54] METHOD AND APPARATUS FOR NO-TILL PLANTING

[75] Inventors: Brian E. Freed, Lexington; David E. Freed, Towanda, both of Ill.

[73] Assignee: Agricommunication and Technology, Inc., Bloomington, Ill.

[21] Appl. No.: 183,697

[22] Filed: Jan. 19, 1994

[51] Int. Cl.6 .......................... A01B 5/00; A01B 13/02
[52] U.S. Cl. ..................... 111/139; 111/140; 111/900; 111/924; 172/29
[58] Field of Search ............... 111/141, 140, 147, 924, 111/900, 139; 172/29

[56] References Cited

U.S. PATENT DOCUMENTS

| | | |
|---|---|---|
| 375,081 | 12/1887 | Lynch . |
| 842,066 | 1/1907 | Beymer ..................... 111/141 X |
| 1,311,427 | 7/1919 | Tulloss . |
| 1,371,012 | 3/1921 | Williams . |
| 1,857,749 | 5/1932 | White . |
| 2,222,015 | 11/1940 | Bateman . |
| 2,734,439 | 2/1956 | Padrick . |
| 3,372,657 | 3/1968 | Hansen . |
| 3,811,387 | 5/1974 | Meiners ..................... 111/924 X |
| 4,404,918 | 9/1983 | Whalen et al. . |
| 4,574,715 | 3/1986 | Dietrich, Sr. et al. . |
| 4,596,199 | 6/1986 | Dietrich, Sr. et al. . |
| 4,723,495 | 2/1988 | Dietrich, Sr. et al. . |
| 4,762,181 | 8/1988 | Cox . |
| 4,785,890 | 11/1988 | Martin . |
| 5,076,180 | 12/1991 | Schneider . |
| 5,129,282 | 7/1992 | Bassett et al. . |
| 5,279,236 | 1/1994 | Truax ..................... 111/924 X |

OTHER PUBLICATIONS

"Cox" Row Zone–A Step Beyond, Cox, Inc. Advertisement, two pages, date unknown.
Mangold, "Beyond Higher Yields And Less Errosion, Enter The Row Zone", Soybean Digest, Feb. 1987, p. 47.
"They go underground for a better seedbed", Farm Journal, Mid–Mar. 1989, p. 18-P.
"Yetter . . . for land's sake!", Yetter Manufacturing Company catalog, Nov. 1992.
"Yetter No–Till Solutions", 1993–1994 The Yetter Catalog, Yetter Manufacturing Company.
Fink, "Field trials test planter attachments", Farm Journal, Mid–Jan. 1993, pp. 10–15.
Ernst, "Strip Preparation Could Heat Up The North", No–Till Farmer, Apr. 1993, pp. 8 and 9.
Mangold, "Fertilizer Strips Aid Corn Growth", Soybean Digest, Oct. 1993, pp. a and d.

Primary Examiner—David H. Corbin
Assistant Examiner—Christopher J. Novosad
Attorney, Agent, or Firm—Barnes & Thornburg

[57] ABSTRACT

A no-till planting apparatus and method is disclosed for use with a planter unit which plants seeds as the planter unit is pulled along a predetermined path. The planter unit includes a double disk opener for cutting a furrow at a predetermined depth and a mechanism for depositing seeds in the furrow. The apparatus includes a disk hiller for forming an elevated ridge including a mixture of soil and residue remaining from a previous crop without cutting the soil at a depth greater the predetermined depth. The disk hiller is coupled directly to the planter unit so that the disk hiller forms the elevated ridge ahead of and aligned with the planter unit so that the planter unit rides on the elevated ridge and plants seeds at substantially the predetermined depth below a top surface of the elevated ridge.

21 Claims, 3 Drawing Sheets

METHOD AND APPARATUS FOR NO-TILL PLANTING

BACKGROUND AND SUMMARY OF THE INVENTION

The present invention relates to a method and apparatus for no-till planting. More particularly, the present invention relates to an improved no-till planter attachment configured to improve seed germination, to provide better plant vigor, and to establish a higher plant stand to promote early-season plant growth.

The goal of most farmers is to complete corn planting as early in the planting season as possible in order to maximize yield potential for corn. For many years, farmers relied upon deep tilling methods using a moldboard plow, a chisel plow, or other apparatus to cut deeply into the soil and bury any residue from a previously planted crop remaining after a harvest. After such primary deep tilling operation, a secondary tilling operation using a plurality of disks or sweeps are used to break up large clumps of tilled soil.

One problem associated with conventional deep tilling methods is the wear and tear on tractors used to pull the deep tilling apparatus. In addition, fuel costs for pulling deep tilling apparatus and for the required multiple passes over the same field are high. Conventional deep tilling methods also contribute to erosion of the cultivated fields by water run off and wind. This erosion problem was addressed in the 1985 farm bill which includes regulations for farming highly erodible land (HEL). Growers that farm HEL must be in compliance with the farm bill regulations by 1994. All farm plans with HEL must have at least 30% residue cover after planting each spring. Farmers must stay in compliance with the farm bill in order to maintain eligibility for USDA subsidy payments.

Over the past several years the concept of no-till or low-till farming has developed. In no-till or low-till farming, fields are not plowed or cultivated between crops. Attachments on the planter open a furrow, deposit seeds therein, and close the furrow in a single pass operation.

Several types of row cleaner devices have been developed to clean residue remaining from a previous crop from an area in front of each planter row as the planter unit is pulled through the field. See, for example, U.S. Pat. No. 4,785,890 to Martin; U.S. Pat. No. 5,076,180 to Schneider; and U.S. Pat. No. 5,129,282 to Bassett et al. These row cleaners typically include a pair of rotating wheels or brushes coupled to the planter unit in front of each row to move residue out of a planter row ahead of a planter unit. Therefore, the row cleaners provide substantially bare, untilled soil in which the planter unit can plant seed.

The apparatus method of the present invention does not clean away the residue from each planter row like the conventional row cleaners discussed above. In fact, the apparatus of the present invention functions in an opposite manner by intentionally moving a mixture of soil and previous crop residue into each planter row. Advantageously, the present apparatus and method of the present invention mixes the remaining residue with soil in an area ahead of each planted row. The mixing of soil and residue in the present invention is shallow mixing which occurs only in a confined area and which does not disturb the soil immediately under the planter unit. There is no need for deep primary or secondary tillage with the apparatus and method of the present invention.

The apparatus of the present invention uses a disk hiller to build up about a 1 inch to about a 1½ inch deep elevated ridge above a top surface of the soil in front of the planter unit. The first and second blades of the disk hiller of the present invention are positioned at an angle relative to each other which is opposite from the angle of the wheels or brushes of the row cleaner devices discussed above so that the disk hiller forms the elevated ridge as the planter unit moves. The disks penetrate the soil on either side of the planted row area approximately ¾ inch deep and cut a 3–4 inch soil width.

The double disk apparatus of the present invention is used in a very reduced or no-tillage farming operation which reduces fuel and labor costs by as much as 60–70% as compared to current practices. The elevated ridge formed by the disk hiller elevates the planter unit slightly above the top surface of the soil. This elevated ridge therefore allows the seeds to be planted at a normal depth by the planter unit, usually about 1¾ inches to about 2½ inches deep, but the seeds are raised up in the soil profile toward the top surface of the soil since the planter unit rides on the elevated ridge.

The apparatus of the present invention evenly mixes the soil and residue which can result in higher percent residue cover. The result is a more even residue cover than if it had been left as no-till. Row cleaning units such as disclosed in the Martin patent reduce the amount of residue cover. The row cleaner units concentrate the residue in area between the planted rows. The disk mixing action of the present invention evenly blends crop residue and soil then places the mixture back in the area of origination. The result from the mixed soil and crop residue is a more even distribution of the residue.

One problem associated with conventional no-till farming methods is slow plant growth early in the season. Typical no-till attachments include a coulter mounted directly in front of each row of the planter. Such coulters can either cause "sidewall" compaction and/or create air pockets, both of which reduce seed germination and seedling growth, especially in cool, wet conditions which are normal during optimum planting dates.

Advantageously, the apparatus of the present invention can be used earlier in the planting season than conventional row cleaner devices. The double disk apparatus of the present invention requires only the top 1 inch to 1½ inches of the soil to be ready to plant. The soil dries and warms up from the top surface in a downward direction. Typical planting time occurs in April in the central corn belt. Soil temperatures in the worked area are often a minimum of 6° F. higher per inch as you move upwardly in the soil profile. For example you could have a temperature at 2½ inches below the top surface of 48°, and a temperature 1 inch higher of about 54°. Such higher temperatures would enhance early season growth of the corn. In the present invention, the seeds are planted about 1 inch to about 1½ inches closer to the top of the "original" soil surface of the soil than conventional planting operations. Therefore, the seed planting position is higher in the soil profile, but still in an undisturbed or untilled soil profile. Seed placement underneath the elevated ridge is in a warmer and drier area than seeds planted at the typical deeper location in the soil profile. This improves the rate of seed germination and improves the growth of the corn early in the season.

The soil in the ridged and upper soil surface is warmer, drier, and more friable than soil farther down in the soil profile. Soil that is more friable allows seeds to have good contact with the soil surrounding the whole seed. Partial attachment of the soil seed contact may result in lower germination and may cause the seed to dry out. This reduces seedling growth and vigor early in the season and often results in lower plant populations. Subsequently corn yield is reduced at harvest. Friable soil at the surface allows the sealing wheels at the back side of the planter to close off the furrow or slot and thereby prevent the soil below the slot area where the seed is planted from drying out.

The apparatus of the present invention also improves water drainage to keep the soil in the planted row moist, but not water logged. The firming action of the gauge wheels of the planter moving over the elevated ridge is an important aspect of the present invention. Water soaks into the elevated ridge instead of eroding the soil away. Water is channeled down either side, but not to the extent that any substantial eroding occurs.

No-till farming increases earthworm population. Earthworms come up to the surface of the soil for feeding and build a small mound areas (midden) by pulling in residue and mixing it in with soil. The crop residue material is a food source and keeps the earthworm channel below open and the moisture high (relative humidity). One aspect of this is that the earthworm middens, surface mound of a earthworm channel, makes the surface area rough to plant crops. By running the double disk units in front of the row, the result would be a smooth area to operate the planter units and a more even distribution of crop residue over the soil surface.

The use of disk hillers in certain types of farm equipment is known. See, for example, U.S. Pat. No. 4,762,181 to Cox and U.S. Pat. No. 3,372,657 to Hansen. The Cox patent discloses a pull type implement which includes a coulter to cut residue and a deep chisel shank to till the soil deeply below the surface. Because of the deep soil shank, the Cox patent discloses a disk hiller located behind the shank to fill in the trenched area formed by the shank. The Cox patent uses a deep tillage operation, and the Cox patent is not concerned with minimizing or providing very little disturbance of the soil like the apparatus and method of the present invention. The Hansen patent also discloses a plow for providing deep tillage of the soil.

According to one aspect of the present invention, a no-till apparatus is provided for use with a planter unit which plants seeds as the planter unit is pulled along a predetermined path. The planter unit includes means for cutting a furrow at a predetermined depth and means for depositing seeds in the furrow. The apparatus includes means for forming an elevated ridge including a mixture of soil and residue remaining from a previous crop without cutting the soil at a depth greater the predetermined depth, and means for coupling the elevated ridge forming means directly to the planter unit so that the elevated ridge forming means forms the elevated ridge ahead of and aligned with the planter unit so that the planter unit plants seeds at substantially the predetermined depth below a top surface of the elevated ridge.

In the illustrated embodiment, the means for forming an elevated ridge includes a disk hiller having a first blade and a second blade spaced apart from the first blade. The first blade and the second blade are aligned at an angle relative to each other to form the elevated ridge.

Also in the illustrated embodiment, the coupling means is configured to position a trailing edge of the first and second blades a predetermined distance ranging from about 4 inches to about 8 inches ahead of the planter unit. Preferably, the predetermined distance is about 6 inches.

Illustratively, a leading edge of the first blade of the disk hiller is spaced apart from a leading edge of the second blade by a distance ranging from about 8 inches to about 16 inches. A trailing edge of the first blade is spaced apart from a trailing edge of the second blade by a distance ranging from about 4 inches to about 8 inches. Preferably, the leading edge of the first blade is spaced apart from the leading edge of the second blade by a distance of about 13 inches, and the trailing edge of the first blade is spaced apart from the trailing edge of the second blade by a distance of about 6 inches. The first and second blades of the disk hiller are illustratively aligned at about a 15° angle relative to an axis of symmetry of the disk hiller.

The planter unit includes a double disk opener for cutting a furrow in the ground at a predetermined depth, means for depositing seeds in the furrow, and a pair of gauge wheels. The top surface of elevated ridge formed by the disk hiller is located about 1 inch to about 1½ inches above a top surface of the soil. The pair of gauge wheels of the planter unit ride on the elevated ridge formed by the disk hiller to provide a raised profile seeding depth for the planted seeds relative to a top surface of the soil. The first and second blades of the disk hiller cut into the top surface of the soil only to a depth less than said predetermined depth of the double disk opener.

According to another aspect of the present invention, an improved no-till farming method is provided for preparing soil covered with a residue from a previous crop for planting seeds using a planter unit. The planter unit includes a double disk opener for cutting a furrow in the soil at a predetermined depth and means for depositing seeds in the furrow. The method includes the step of forming an elevated ridge including of a mixture of soil and residue ahead of the planter unit by cutting below a top surface of the soil at a depth less than said predetermined depth to mix soil and residue in front of the planter unit so that the planter unit plants seeds below a top surface of the elevated ridge to provide a raised profile seeding depth for the planted seeds relative to the top surface of the soil.

Additional objects, features, and advantages of the invention will become apparent to those skilled in the art upon consideration of the following detailed description of a preferred embodiment exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
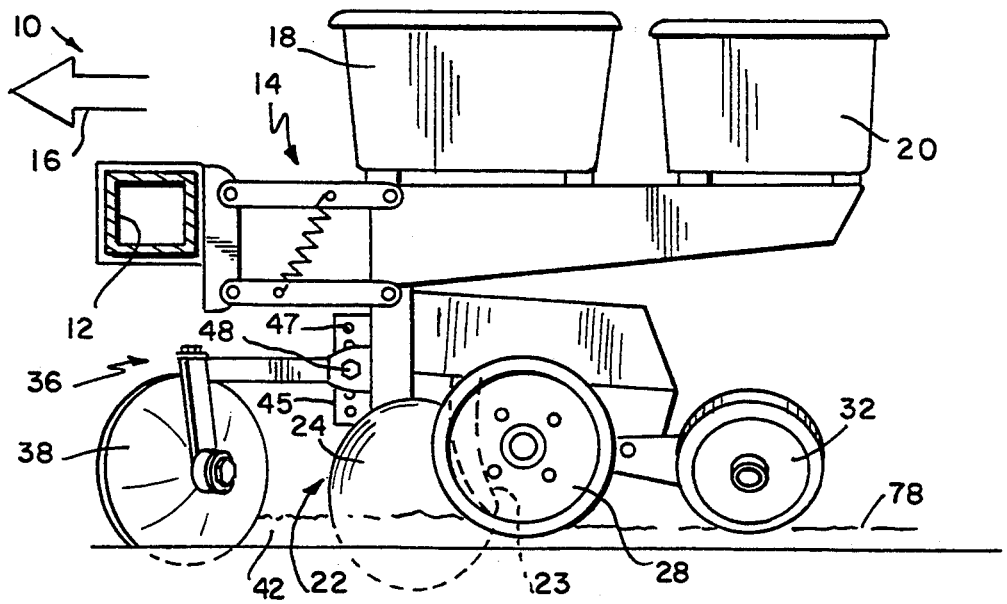
FIG. 1 is a side elevational view of a planter assembly of the present invention which includes a double disk hiller mounted in front of the planter unit.

Referring now to the drawings, FIG. 1 illustrates a conventional planter unit 10 which is mounted to a tool bar 12 by linkage 14. Planter unit 10 is pulled in the direction of arrow 16 by a tractor (not shown). The planter unit 10 includes a seed hopper 18 and a fertilizer hopper 20. Planter unit 10 also includes a double-disk opener 22 including first and second disk blades 24 and 26, respectively, for cutting a furrow in the soil for receiving seeds therein. A pair of laterally spaced apart gauge wheels 28 and 30 are located behind double-disk openers 22. Planter unit 10 also includes means 23 for depositing seeds in the furrow formed by double disk opener 22. A pair of press wheels 32 and 34 are located behind gauge wheels 28 and 30, respectively. It is understood that double disk openers 22, gauge wheels 28 and 30, and press wheels 32 and 34 do not limit the present invention. Other arrangements of these elements may be provided for planting seeds in the soil.

The apparatus of the present invention includes a double disk hiller apparatus 36 coupled to planter unit 10. Double disk hiller 36 includes a pair of spaced apart disk blades 38 and 40 which are aligned at an angle relative to each other to form an elevated ridge 42 in line with a planter row as planter unit 10 is pulled in the direction of arrow 16. It is understood that a disk hiller 36 is coupled in front of each row of the planter.

Figure 2:
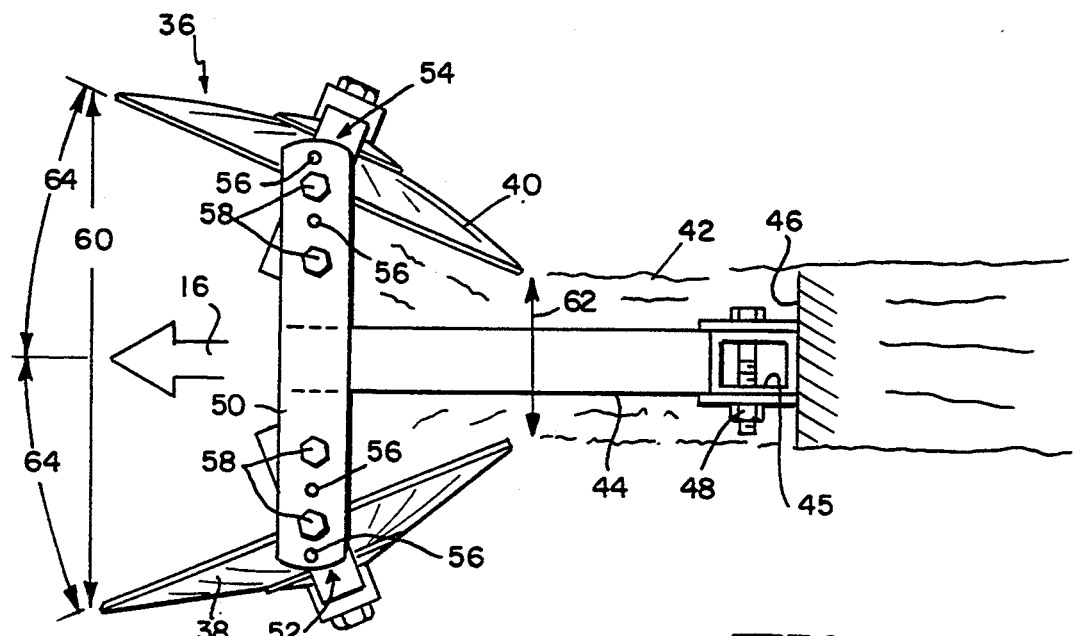
FIG. 2 is a top plan view of one embodiment of the double disk hiller of the presented invention.

One embodiment of the double-disk hiller 36 is illustrated in FIG. 2. In this embodiment, a square tube frame member 44 is coupled to a vertical mounting bracket 45 with a suitable fastener 48. Illustratively, mounting bracket 45 is a square tube having as a plurality of apertures 47 formed therein to permit the height of disk hiller 36 to be adjusted relative to planter unit 10. Mounting bracket 45 is welded or otherwise secured to a front wall 46 of planter unit 10. A T-frame 50 is coupled to frame member 44. Disk blades 38 and 40 are coupled to frame member 50 by spindle and arm assemblies 52 and 54, respectively. The angle of disk blades 38 and 40 relative to each other is adjustable using holes 56 and fasteners 58. Leading edges of disk blades 38 and 40 are spaced apart a first predetermined distance illustrated by dimension 60 in FIG. 2. Trailing edges of blades 38 and 40 are spaced apart by a second predetermined distance illustrated by dimension 62. Preferably, dimension 60 is about 13 inches, and dimension 62 is about 6 inches. Therefore, blades 38 and 40 are aligned at a predetermined angles 63 and 64, respectively, relative to an axis of symmetry 67 of disk hiller 36 to form elevated ridge 42 as planter unit 10 moves. Preferably, angles 63 and 64 are about 15°. The spacing and angulation of double disk blades 38 and 40 may be changed based upon the characteristics of the ground being worked. As the amount of residue on the soil increases, the angles 63 and 64 decrease. As the amount of residue on the soil decreases, angles 63 and 64 increases. For most applications, distance 60 will range from about 8 inches to about 16 inches. Also for most applications, the distance 62 will range from about 4 inches to about 8 inches. Preferably, a trailing edge of each double disk hiller blade 38 and 40 is spaced apart from double disk openers 22 by a predetermined distance illustrated by dimension 65 in FIG. 5. Illustratively, dimension 65 has a range between about 0 to about 16 inches. Preferably, dimension 65 is about 6 inches.

It is understood that although disk blades 38 and 40 are preferably round, 13½ inch disk blades, that other types of disk blades or wheels may be used in accordance with the present invention. For instance, notched wheels or wheels containing a plurality of teeth may be used in place of disk blades 38 and 40. Any type of means configured to be coupled to the planter unit ahead of the planting apparatus for creating an elevated ridge 42 including a mixture of soil and residue directly in front of the planter unit and without any type of deep tillage can be used in accordance with the present invention.

Figure 3:
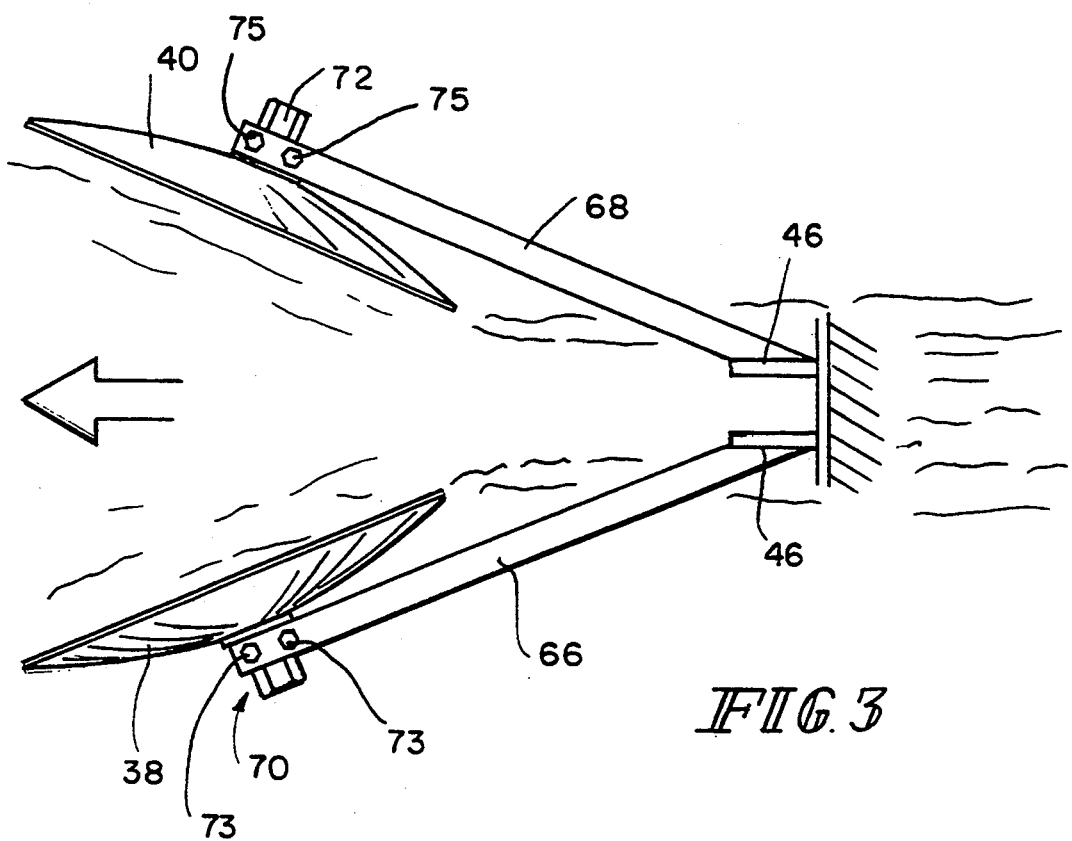
FIG. 3 is a top plan view of a second embodiment of the double disk hiller of the present invention.

Another embodiment of the double disk hiller is illustrated in FIG. 3. In FIG. 3, spaced apart disk blades 38 and 40 are coupled directly to planter row unit bracket 46 by angled frame members 66 and 68, respectively. Frame members 66 and 68 are illustratively welded or otherwise coupled to row unit bracket 46. Blades 38 and 40 are coupled to frame members 66 and 68, respectively, by spindle assemblies 70 and 72, respectively. The angle of blades 38 and 40 are adjustable using fasteners 73 and 75, respectively, in a conventional manner.

Figure 4:
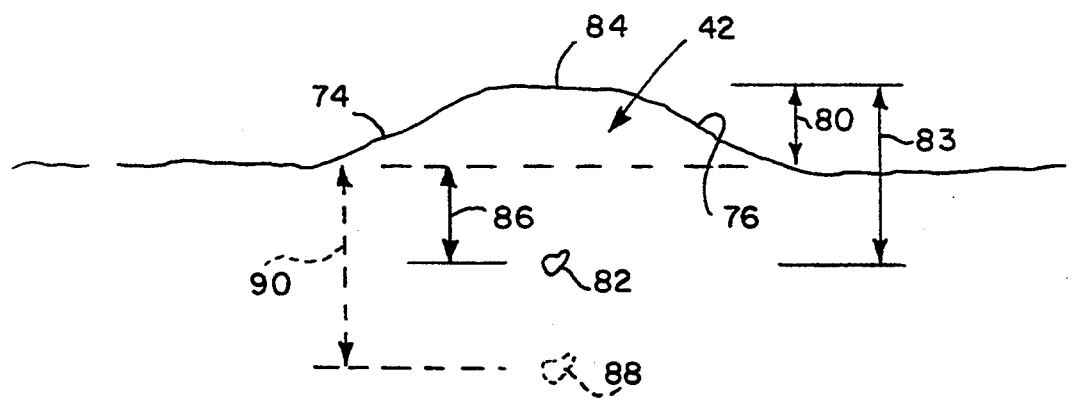
FIG. 4 is a diagrammatical view illustrating a raised or elevated ridge profile formed by the double disk hiller and the location of a seed planted by the planter unit into the raised ridge profile.

FIG. 4 is a diagrammatical view illustrating the planting results of the no-till planting apparatus and method of the present invention. Double disk hiller 36 located in front of each planter unit creates elevated ridge 42 having opposite side surfaces 74 and 76. Elevated ridge 42 is located above the normal soil surface level 78 as illustrated by dimension 80 in FIG. 4. Dimension 80 is preferably about 1 inch to about 1½ inches. A seed 82 is planted by planter unit 10 at a depth of about 1¾ inches to about 2½ inches below top surface 84 of elevated ridge 42 as illustrated by dimension 83. Disk hiller 36 causes soil to strike blades 24 and 26 of double disk opener 22 as planter unit. 10 moves in the direction of arrow 16 so that gauge wheels 28 and 30 ride on elevated ridge 42. Therefore, because planter unit 10 rides on elevated ridge 42, seed 82 is planted about ¾ inch to about 1 inch below the normal soil surface level 78 as illustrated by dimension 86. Therefore, seed 82 is located about 1 inch to 1½ inches higher than a normal seed location which is illustrated by dotted lines 88. Conventional seed 88 is therefore located about 1¾ inches to about 2½ inches below the normal surface level 78 as illustrated by dimension 90. Gauge wheels 28 and 30 and press wheels 32 and 34 compress or compact elevated ridge 42 slightly as illustrated in FIG. 1.

Advantageously, the apparatus and method of the present invention plants seeds in a raised or elevated seed profile level without using any primary deep tillage. In contrast to U.S. Pat. No. 4,762,181 to Cox discussed above, the improved apparatus of the present invention does not use any primary or secondary tillage. This reduces the amount of fuel and labor cost as much as 60%–70%, as compared to conventional deep tillage instruments. Therefore, wear and tear on the equipment will also be reduced. The apparatus of the present invention also includes no secondary tillage. The apparatus of the present invention advantageously cuts the soil only to a depth less than the depth of double disk opener 22.

Advantageously, the seeds planted in raised profile location 82 are typically 6° F.–8° F. warmer than seeds planted at the normal depth illustrated by location 88. In addition, elevated ridge 42 tends to keep seeds 82 drier. Rain water moves down sides 74 and 76 of elevated ridge 42 and soaks into elevated ridge 42. Rain water collects in the area between adjacent elevated ridges 42 and therefore does not wash away seeds 82 planted in the elevated ridge 42.

Figure 5:
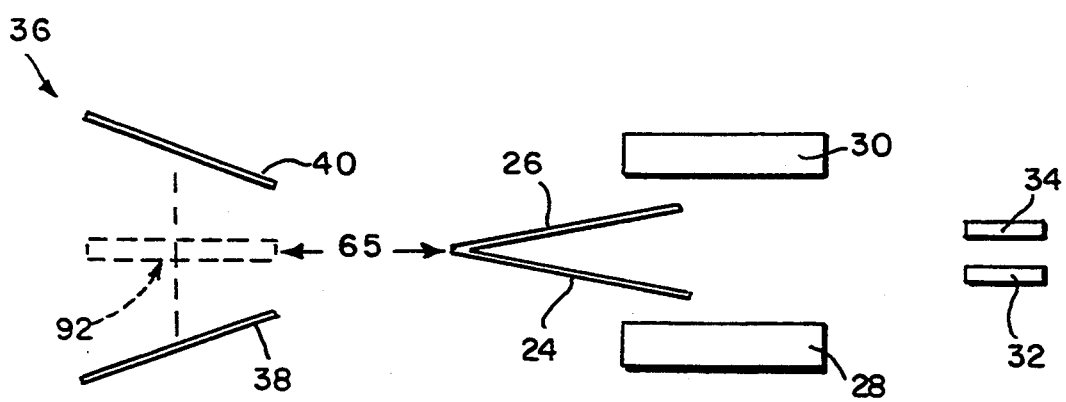
FIG. 5 is a diagrammatical plan view illustrating the angular and spacial relationships of the components of the planter unit, the disk hiller apparatus, and an optional coulter of the present invention.

If desired, an optional coulter illustrated by dotted lines 92 in FIG. 5 may be added between blades 38 and 40 of double disk hiller 36. Coulter 92 is coupled to planter unit 10 or to double disk hiller assembly 36 in a conventional manner. The coulter is set to cut soil at a depth of about 2 inches to about 2¼ inches below top surface 78. Therefore, the depth of the coulter is less than the depth of double disk openers 22 which are typically set at about 2½ inches below top surface 78. It is understood that more than one coulter can be used if desired.

In certain instances, such as in heavy residue situations, disk hiller 36 may be used in conjunction with a row cleaner such as disclosed in the Martin patent discussed above. Any toothed, finger-type, or other apparatus that moves crop residue may be used in front of disk hiller 36. One or more wheeled units can be used to move the residue. The row cleaner may also be used with the optional coulter. The disk hiller is coupled between the row cleaner and the planter unit.

In other instances, a single angled blade may be used to form the elevated ridge 42. Disk size or shape of the disk hiller is not a limiting factor of the present invention. Any apparatus coupled directly to the planter unit for forming an elevated ridge 42 may be used in accordance with the present invention.

Although the invention has been described in detail with reference to a certain preferred embodiment, variations and modifications exist within the scope and spirit of the invention as described and defined in the following claims.

What is claimed is:

1. A no-till farming apparatus for use with a planter unit which plants seeds as the planter unit is pulled along a predetermined path, the planter unit including at least on gauge wheel, the apparatus comprising:
    a disk hiller configured to form an elevated ridge including a mixture of soil and residue remaining from a previous crop; and
    means for coupling the disk hiller directly to the planter unit to position the disk hiller in front of and aligned with the planter unit so that the planter unit plants seeds a predetermined distance below a top surface of the elevated ridge formed by the disk hiller, the at least one gauge wheel of the planter unit being configured to ride on the elevated ridge to provide a raised profile seeding depth for the planted seeds relative to a top surface of the soil.

2. The apparatus of claim 1, wherein the disk hiller includes a first blade and a second blade spaced apart from the first blade, the first and second blades being aligned at an angle relative to each other to form the elevated ridge.

3. The apparatus of claim 2, wherein the coupling means includes a first frame member coupled to the first blade and to the planter unit and a second frame member coupled to the second blade and to the planter unit.

4. The apparatus of claim 2, wherein the coupling means is configured to position a trailing edge of the first and second blades within about 0 to about 16 inches ahead of the planter unit.

5. The apparatus of claim 4, wherein the trailing edges of the first and second blades are spaced apart from the planter unit by about 6 inches.

6. The apparatus of claim 2, wherein a leading edge of the first blade is spaced apart from a leading edge of the second blade by a distance ranging from about 8 inches to about 16 inches, and a trailing edge of the first blade is spaced apart from a trailing edge of the second blade by a distance ranging from about 4 inches to about 8 inches.

7. The apparatus of claim 2, wherein a leading edge of the first blade is spaced apart from a leading edge of the second blade by a distance of about 13 inches, and a trailing edge of the first blade is spaced apart from a trailing edge of the second blade by a distance of about 6 inches.

8. The apparatus of claim 2, wherein the first and second blades of the disk hiller are aligned at about a 15° angle relative to an axis of symmetry of the disk hiller.

9. The apparatus of claim 1, further comprising a coulter coupled to the planter unit, the coulter being positioned adjacent the disk hiller.

10. The apparatus of claim 1, wherein the planter unit includes a double disk opener for cutting a furrow in the ground at a predetermined depth, means for depositing seeds in the furrow, and a pair of gauge wheels, the pair of gauge wheels riding on the elevated ridge formed by the disk hiller to provide a raised profile seeding depth for the planted seeds relative to a top surface of the soil.

11. The apparatus of claim 10, wherein the disk hiller includes a first blade and a second blade spaced apart from the first blade, the first and second blades of the disk hiller cutting into the top surface of the soil only to a depth less than said predetermined depth of the double disk opener.

12. The apparatus of claim 1, wherein the top surface of elevated ridge formed by the disk hiller is located about 1 inch to about 1½ inches above a top surface of the soil to provide a raised profile seeding depth for seeds planted by the planter unit relative to the top surface of the soil.

13. The apparatus of claim 1, wherein the coupling means includes means for adjusting the height of the disk hiller relative to the planter unit.

14. A no-till apparatus for use with a planter unit which plants seeds as the planter unit is pulled along a predetermined path, the planter unit including a means for cutting a furrow at a predetermined depth, means for depositing seeds in the furrow, and at least one gauge wheel, the apparatus comprising:
    means for forming an elevated ridge including a mixture of soil and residue remaining from a previous crop without cutting the soil at a depth greater than the predetermined depth; and
    means for coupling the elevated ridge forming means directly to the planter unit so that the elevated ridge forming means forms the elevated ridge ahead of and aligned with the planter unit so that the planter unit plants seeds at substantially the predetermined depth below a top surface of the elevated ridge, the at least one gauge wheel of the planter unit being configured to ride on the elevated ridge to provide a raised profile seeding depth for the planted seeds relative to a top surface of the soil.

15. The apparatus of claim 14, wherein the means for forming an elevated ridge includes a disk hiller having a first blade and a second blade spaced apart from the first blade, the first blade and the second blade being aligned at an angle relative to each other to form the elevated ridge.

16. The apparatus of claim 15, wherein the coupling means is configured to position a trailing edge of the first and second blades within about 0 to about 16 inches ahead of the planter unit.

17. The apparatus of claim 15, wherein a leading edge of the first blade is spaced apart from a leading edge of the second blade by a distance ranging from about 8 inches to about 16 inches, and a trailing edge of the first blade is spaced apart from a trailing edge of the second blade by a distance ranging from about 4 inches to about 8 inches.

18. The apparatus of claim 15, wherein the first and second blades of the disk hiller are aligned at about a 15° angle relative to an axis of symmetry of the disk hiller.

19. The apparatus of claim 14, further comprising a coulter coupled to the planter unit, the coulter being positioned adjacent the means for forming an elevated ridge.

20. The apparatus of claim 14, wherein the top surface of elevated ridge is located about 1 inch to about 1½ inches above a top surface of the soil to provide a raised profile seeding depth for seeds planted by the planter unit relative to the top surface of the soil.

21. An improved no-till farming method for preparing soil covered with a residue from a previous crop for planting seeds using a planter unit including a double disk opener for cutting a furrow in the soil at a predetermined depth and means for depositing seeds in the furrow, the method comprising the step of forming an elevated ridge including a mixture of soil and residue ahead of the planter unit by cutting below a top surface of the soil only to a depth less than said predetermined depth to mix soil and residue in front of the planter unit so that the planter unit plants seeds below a top surface of the elevated ridge to provide a raised profile seeding depth for the planted seeds relative to the top surface of the soil.

* * * * *